Patented Nov. 27, 1951

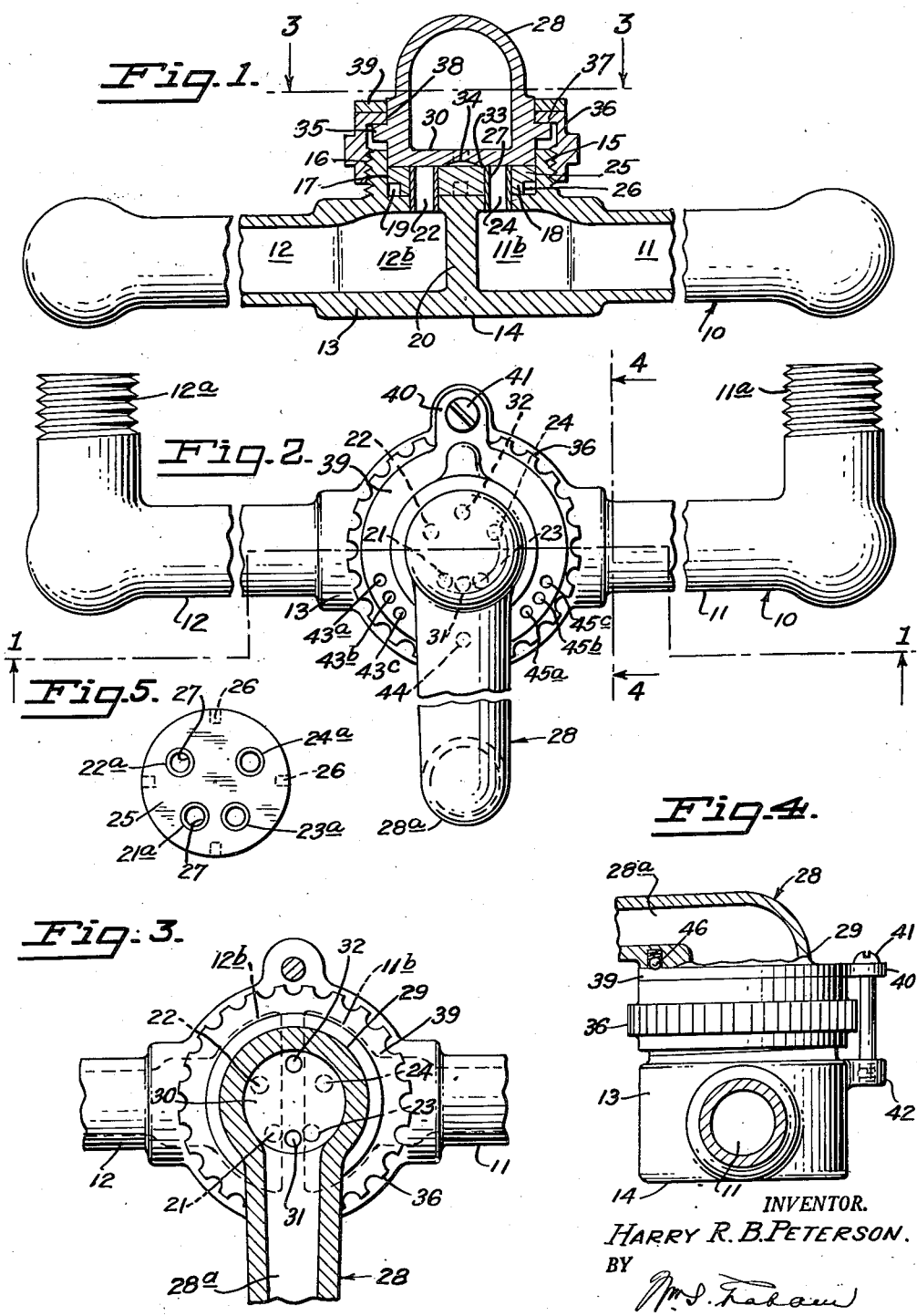

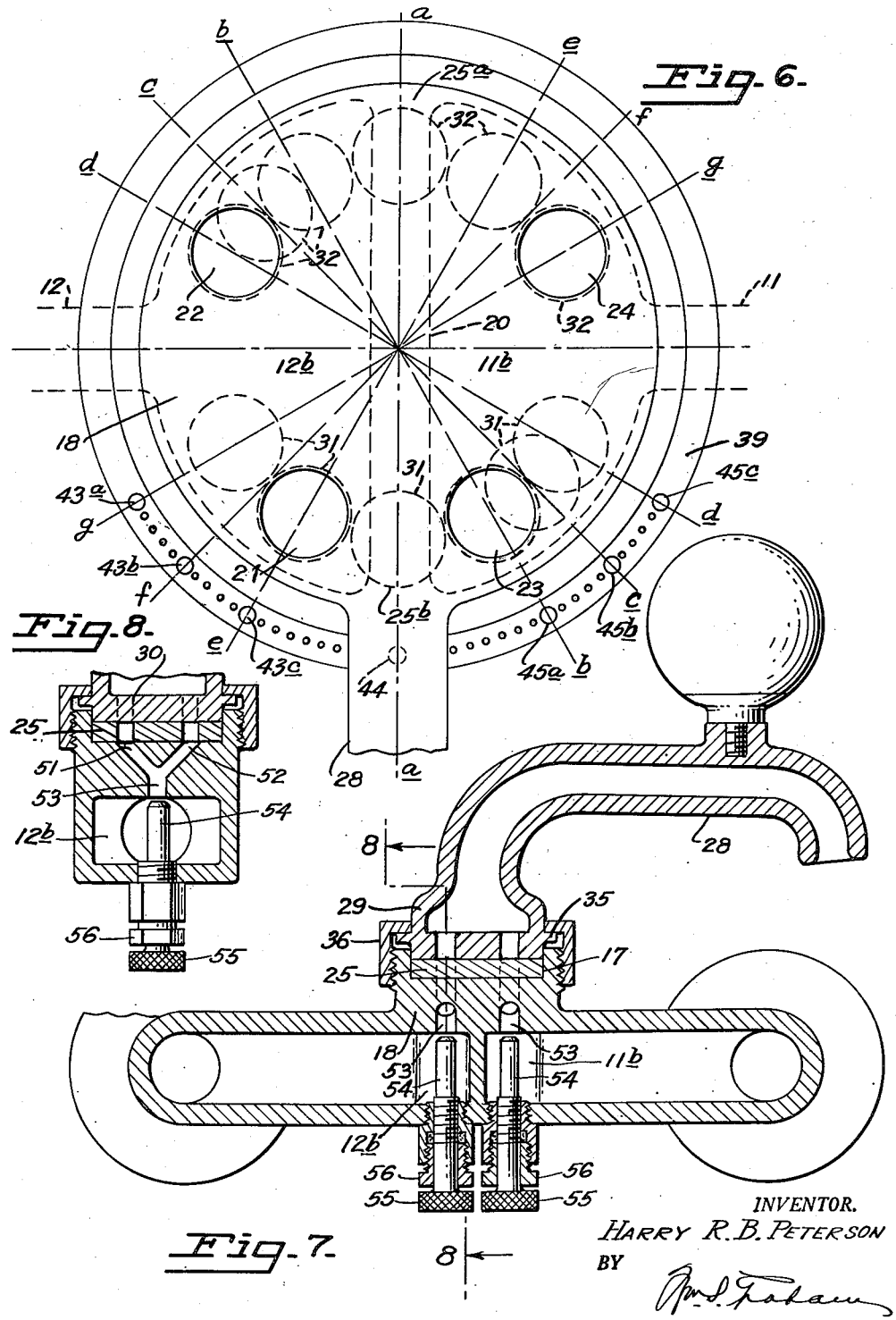

2,576,414

UNITED STATES PATENT OFFICE 2,576,414

COMBINATION FAUCET

Harry R. B. Peterson, Daly City, Calif.

Application September 29, 1947, Serial No. 776,780

3 Claims. (Cl. 251—88)

This invention relates to improvements in combination faucets and more particularly relates to quick opening combination faucets in which the base of the nozzle spout operates as a disc valve.

Combination faucets in general are those types in which either of a plurality of liquids may be dispensed separately or simultaneously combined for discharge through a single nozzle spout. Such faucets may be of two classes; firstly, wherein a manually operable handle controls the flow, and secondly, where manipulation of the nozzle spout controls flow from separate sources, or simultaneously from a plurality of conduits. As examples of two liquids adaptable for flow in the faucets, hot and cold water, and the mixing of two feed lines for beer, are used herein as examples of liquids to be dispensed.

Heretofore there have been combination faucets in which the nozzle spout operates a ground cone seat valve, but such faucets have disadvantages in that the cooperating cone seat and valve stem cone frequently require grinding, graphiting, and packing against leakage, and which develop frictional binding when tightly fit, and leakage when loosely fit. A further disadvantage of such faucets is wear and cutting of packing gaskets.

It is therefore an object of this invention to provide a combination dispensing faucet in which valve ports are opened and closed by relative rotation of superficially contacting discs; to provide in such a combination faucet relative axial rotation of a disc plate integral with the base of a swinging nozzle spout; to provide a disc valve seat of compressible material; to provide for operability to dispense both kinds of liquid separately or mixed on both sides of the faucet center; to provide for easy and convenient adjustability of relative tightness of fit between valve and seat; to provide a simple and convenient combination faucet rugged in its parts, economical in manufacture, and efficient in operation, and generally to improve upon known devices of the character described.

With the foregoing and other objects in view which will more fully appear herein, an advantageous form in which the invention may be exemplified is described in this specification and illustrated in the accompanying drawings which are made a part hereof, it being understood that changes by substitution of equivalents may be made in form, size, shape, materials, and minor details without departing from the spirit of the invention which is defined in the appended claims.

In the drawings:

Fig. 1 is a front elevation, partly broken and partly in vertical section on line 1—1 of Fig. 2;

Fig. 2 is a top plan view, partly shown fragmentarily by broken lines;

Fig. 3 is a fragmentary lateral transverse section on line 3—3 of Fig. 1;

Fig. 4 is a fragmentary side view, partly in section on line 4—4 of Fig. 2;

Fig. 5 is a plan view of a washer member;

Fig. 6 is an enlarged diagrammatic view to illustrate operation;

Fig. 7 is a vertical longitudinal section of modified form of the invention; and Fig. 8 is a fragmentary enlarged vertical section on line 8—8 of Fig. 6.

Referring firstly to Figs. 1 to 4, inclusive, of the drawings in which like reference characters indicate corresponding operational parts in the several views, 10 indicates generally an integral conduit casting having a pair of oppositely extending feed conduits designated respectively 11 for cold water, and 12 for hot water, each of the feed conduits being threaded as usual at the opposite free terminal ends 11a and 12a, for connection to suitable sources of liquid supply.

Intermediate its ends and preferably centrally thereof the casting is enlarged to provide what may be termed a hollow integrally cast hub generally indicated 13, the opposite end of the respective supply conduits terminating within the hollow of said hub in flared chambers, indicated, respectively, 11b and 12b, separated within the hollow hub by a dividing wall 20.

The hollow hub is closed at its bottom 14 by the casting wall and at its top has an upwardly flanged circular collar wall 15, exteriorly threaded at 16, and providing a central annular recess as indicated at 17, the bottom of the recess being closed by a fixed preferably integral seat plate 18. At the bottom of the recess 17 are circumferentially spaced lugs 19 for purposes hereafter stated.

The seat plate 18 is provided with two pairs of relatively circumferentially spaced orifices, one pair being on each side of, and spaced from, the lateral transverse central diameter of the seat plate, this diameter overlying the partition wall 20. The orifices in each pair are also relatively spaced concentrically relative to the axis of seat plate 18. One pair, 21 and 22, communicates with the hot water supply conduit chamber 12b, and the other pair, 23 and 24, communicates with the cold water supply conduit chamber 11b. The two orifices in each pair are relatively spaced so that the two orifices in that pair are on opposite sides of a normal diameter perpendicular to said lateral diameter, whereby there is an orifice in each of the four quadrants of the seat plate. In plan, the plate orifices are preferably circular, and if the circular form is employed, the center of each of the circles may have the same length of radius from axial center of plate 18, but the center of each circle is on a different diameter of the plate 18. The orifices 21, 23 which respectively communicate with the hot and cold water supply conduits are disposed on opposite sides of the lateral transverse diameter of neutral zone 25a—25b of the plate at suitable relative angularity depending on the size of orifices and plate, approximately 60° being illustrated. Also the orifices 22, 24 which respectively communicate with the hot and cold water supply conduit are on opposite sides of said lateral transverse diameter. The seat plate diameter on which the center of the hot water orifice 22 is located, is offset from the plate diameter passing through the center of cold water orifice 23, and the seat plate diameter on which the center of the cold water orifice 24 is located, is offset from the plate diameter passing through the center of hot water orifice 21. Such offsets should be at least equal to one-half of the length of the diameter of the discharge port of a valve plate to be further described, such offset effecting a positioning of diametrally disposed orifices so that their respective perimeters substantially contact the same plate diameter, and are on the same side of such diameter. It is preferred for convenience of swinging a nozzle spout, as hereafter described, that such offset be toward the other of the orifices in that pair of orifices opening into the same liquid supply line. With this arrangement there are no orifices in the seat plate 18 intersecting or closely adjacent to the lateral transverse diameter of the plate, thus providing along said diameter a neutral zone 25a—25b substantially overlying the dividing wall 20 which is in the hollow hub.

It is to be understood that the circular form of plate orifices has been employed herein as one exemplification only, since oval or arcuately elongated, or square or other geometric figures may likewise be employed, the circle being preferred principally because it is relatively easy to cast or drill such orifices in the plate.

Snugly disposed coaxially within the recessed circular opening 17 and supported in close contact with the plate 18 and the inner wall of recess 17 is a circular disc washer 25, having circumferentially spaced notches 26 at its lower edge portion to receive the lugs 19 for preventing the axial rotation of the washer. The washer, though not rigid, is of relatively non-flexible tough and mediumly hard material such as compressed leather or fiber or rubber indurated with textile fibers, or such like tough semi-hard material having very minor degree of compressibility. The washer has openings 21a, 22a, 23a and 24a therethrough corresponding in position to, and overlying the orifices in plate 18, the washer openings being of slightly greater diameter than the openings of the plate so as to tightly receive in each of the washer openings a tubular liner 27, the lower end of which extends below the washer and engages in the orifice of the plate, preventing the opening in the slightly compressible washer from becoming restricted by pressure thereon or diminished in diameter by swelling of the washer from absorption of liquid.

A dispensing nozzle 28 is provided having a tubular spout 28a and a base 29, the base being closed by a circular valve plate 30 having a pair of vents or port openings 31 and 32 therethrough, said port openings being substantially parallel with the axes of the seat plate 18 and valve plate 30 and having their centers on a common diameter of the valve plate and oppositely spaced by equal radii from the axis of said valve plate, said radii being of substantially the same length as the radii of the orifices of the recessed seat plate 18 and washer 25. The diameter of the valve plate is substantially equal to the diameter of the recessed opening 17 so that the valve plate 30 is coaxial with seat plate 18 and washer 25, the valve plate being received in said recess snugly and rotatably slidable therein. The valve plate is provided with a ground and polished valve face 33 in facial slidable contact with the upper face of washer 25. When so mounted, the respective openings or orifices through the seat plate 18, washer 25 and valve plate 30 are coaxial and adapted for substantial selective register and offset by swinging the nozzle spout.

In relatively large faucet devices, it may be desirable to provide in the valve face 33 a concavity 34 to reduce friction of rotation.

For securing and adjusting the valve plate on its seat in the recess 17 and in facial contact with the washer 25, there is provided a circumferential outwardly extending shoulder 35 on the exterior wall of the nozzle base 29, and an internally threaded and externally knurled bridge nut 36, the threads engaging with the threads 16 of the upstanding hub wall and with the radially inturned flange or bridge 37 slidably engaging upon the extended flange 35 of the nozzle base, said nut having an opening 38 at its top through which may be passed the nozzle spout and the base portion of the nozzle which is beyond the extended shoulder 35.

Overlying the inturned flange or bridge of adjusting nut 36, there is a guide ring 39 which has a central opening to snugly fit around the base of the nozzle, and provided at its rear with an extended lip 40 having an eye through which a set screw 41 may be inserted, the shank of the screw passing through and being engaged in an indent of the knurl of adjusting nut 36 and having its threaded end engaged by a screw in a boss 42 of the casting hub 13. Thus the guide ring 39 is locked against rotation and the adjusting nut 36 is stayed against casual rotation to inadvertently loosen or tighten the valve upon its washer seat. Intentional loosening or tightening of the valve on its seat may, however, be accomplished by removing the screw and adjusting the nut 36. The upper forward face of the guide ring is provided with an index or flow-guide, comprising spaced groups of indents aligned with diameters of the seat plate 18 and indicated 43a, b and c on the side of center adjacent the hot water supply conduit, and indicated 45a, b, c on the side of center adjacent the cold water supply conduit, and an additional central neutral position 44. The under face of the nozzle spout is provided in its vertical longitudinal axial plane with a spring-loaded ball button 46, the ball of which resiliently and releasably engages in the indents of the guide ring to indicate and resiliently hold the proper positioning of the nozzle spout to effect flow of liquid through any predetermined ports of the valve, or to cut off the flow entirely.

From the foregoing, it will be observed that the rotatable mounting of the nozzle base in recess 17 permits the nozzle 28 to be swung from side to side at its discharge end and thus axially rotate the valve plate 30 upon its sealing seat on washer 25.

Referring now to the diagram of Fig. 6, in which orifices in the seat plate are shown in full line and various positions of ports in the valve plate are shown in broken line. In this diagram the openings of ports 31, 32 are slightly enlarged so as to show double lines at positions overlying openings in the seat plate. When the spring-loaded ball or button is in the indent 44 of guide index 39, the ports 31, 32 in the valve plate, having their centers in line with the longitudinal center line of the spout, are on the diameter a—a and overlie the partition wall 20 and the neutral zone 25a—25b of the valve seat plate in which there are no orifices communicating with either the hot or cold water supply conduits. The faucet is then in "off" position of no flow. By swinging the spout toward the cold water supply conduit 11 until the guide ball is in indent 45a, the valve port centers are on the diameter b—b at which position the valve port 31 overlies the cold water orifice 23 and the valve port 32 does not communicate with any opening at all, being closed by facial contact with washer 25. Therefore, a supply of cold water only flows through the nozzle. At this position, however, the perimeter of valve port 32 is closely adjacent the perimeter of seat plate orifice 22.

Upon further swinging the nozzle toward the indent 45b, the valve port 31 begins to cease register with orifice 23, which commences to close, whereas valve port 32 commences to overlie the plate orifice 22 whereby a mixture of hot and cold water is dispensed, the quantity relationship being determined by the extent to which the nozzle is swung to open one orifice and close the other. When the swinging nozzle is moved to engage indent 45b, the centers of the valve ports 31, 32 are on diameter c—c, at which position the valve port 31 overlies the orifice 23 to the extent of its length of radius, and the remainder of the valve port is closed by facial contact with the washer 25. Simultaneously the valve port 32 has been moved to overlie the orifice 22 to the same extent. Since orifice 23 communicates with the cold water supply and orifice 22 communicates with the hot water supply, the indent 45b on the guide ring index indicates that at that position a mixture of equal quantities of hot and cold water will flow from the nozzle.

By further swinging the nozzle to engage the indent 45c, the centers of the valve ports 31, 32 are on the diameter d—d, at which position the valve port 31 does not overlie any orifice at all, but is completely closed by facial contact with the washer 25. But simultaneously the valve port 32 has been moved to completely overlie the orifice 22 which communicates solely with the hot water supply line, so that the indent 45c indicates that hot water only will be discharged even though the nozzle is swung to the cold water supply side of the faucet.

The same operation is effective by swinging the nozzle in the opposite direction from the off position of indent 44 toward the hot water supply conduit. First, at the guide position 43c the centers of ports 31, 32 are on diameter e—e, and port 31 overlies the hot water orifice 21 and the port 32 is completely closed by facial contact with the washer 25. And successively the nozzle may be swung to guide position 43b on diameter f—f for a combination of hot and cold water at which position the port 31, to the extent that its radius overlies the hot water orifice 21, and to the extent that the port 32 equally overlies the cold water orifice 24.

From the foregoing it will be evident that when the nozzle is further moved to engage the indent 43a and the centers of the valve ports are on diameter g—g, the port 31 will be completely closed while port 32 fully communicates with the cold water supply orifice 24, thus cold water only is discharged though the nozzle is swung to the side of hot water supply.

Variation in the flow of the hot and cold water, or any other two types of liquids, may likewise be obtained by moving the nozzle to intermediate positions between those above described. For positions of intermediate adjustment in faucets of large size it may be desirable to provide small notches between the principal indents, for easily movable engagement by the spring ball, to stabilize the nozzle at any desired position where any desired variation of volume of flow or quantitative mixture may be obtained.

In Figs. 7 and 8 there is illustrated a modification particularly adapted to faucets useful for draft beer where it is desired to selectively mix two types or serve either type separately, and also provide means to regulate an increase or decrease of the volume of flow of either type. Usually draft beer does not flow under as high a pressure as is employed in water conduits, nor is a high velocity desired at the discharge spout. Therefore, the supply conduits may be relatively small. Smallness of conduits is desirable because beer or other foam-forming beverages go flat upon exposure to atmospheric pressure for considerable time. For that reason it is desired to retain as little as possible of that type of beverage in the conduits and they are made correspondingly of lesser length and diameter. The chambers 11b and 12b of Fig. 7 may be provided at the inner end of the supply conduits, and instead of providing a pair of parallel orifices through the seat plate 18 on each side of the central lateral transverse diameter as in Figs. 1 to 5, the two orifices 51, 52 at the upper face of the seat plate 18 which comprises a group or pair of openings into the same supply line are relatively tapered toward each other and communicate with and converge into a single orifice 53 at the opposite face of the plate, forming a Y-shaped orifice in vertical section as in Fig. 8, having a single opening into a supply line at one face of the seat plate and two openings at the opposite face of the seat plate, the latter two openings having communication with registering openings in the washer 25 and thus adapted for selective communication with ports of the valve plate 30, in like manner as described in respect of Figs. 1 to 5.

By providing a single feed orifice 53 into the supply line, it is readily practicable to provide a flow control or adjustment plug 54 threadedly mounted in the bottom of the faucet hub and aligned with the single opening, the plug being adjustable from the exterior of the faucet by knurled finger grips 55 and lock nut 56. In other respects the faucet of Figs. 7 and 8 may have functional elements similar to those in Figs. 1 to 5, and operate in substantially the same manner as diagrammatically explained in respect of Fig. 6.

Having described the invention, what is claimed as patentable is:

1. A faucet device of the character described including a tubular faucet body having a pair of separate fluid supply conduits separated by a dividing wall, a valve seat plate having two pairs of orifices therethrough the orifices in each pair being relatively spaced; one of said pairs of orifices communicating with one of said supply conduits and the other of said pairs of orifices communicating with the other supply conduit, the orifices in at least one of said pairs being forked intermediate the opposite faces of the plate providing a pair of spaced orifices at one face of said plate and a single orifice at the opposite face of the plate, an orifice in each of said pairs being relatively diametrally disposed and offset from diametrical alignment relative to an orifice of the other of said pairs, said diametrally disposed orifices having their respective perimeters substantially contacting the same side of a plate diameter, an axially rotatable valve plate having ports for communicating with the openings of the seat plate, a packing washer between the seat plate and valve plate having perforations therethrough registering with the openings in one of said plates, and a tubular discharge nozzle mounted in communication with the ports of the valve plate and to swing arcuately in unison with rotation of the valve plate.

2. A faucet device of the character described including a tubular faucet body having a pair of separate fluid supply conduits, a valve seat plate providing a closure wall portion for each of said supply conduits, said seat plate having two pairs of concentrically disposed orifices therethrough, one of said pairs of orifices communicating with one of said supply conduits, and the other of said pairs of orifices communicating with the other supply conduit, one of said orifices being in each quadrant of the seat plate, one orifice in each of said pairs being diametrally disposed and offset from diametric alignment relative to an orifice of the other of said pairs, an axially rotatable valve plate having ports therein diametrally oppositely disposed for selectively communicating with the orifices of the seat plate upon rotation of the valve plate, means for rotating the valve plate, and a tubular discharge nozzle mounted in communication with the ports of the valve plate.

3. In a dispensing faucet device, a tubular faucet body having a pair of separate fluid supply conduits each having an outlet, said faucet having a recess for a valve seat plate at said outlets, a valve seat plate in the bottom of said recess and providing a closure for said outlet, said seat plate having two pairs of orifices therethrough, one of said pairs of orifices communicating with one of said supply conduits and the other of said pairs of orifices communicating with the other supply conduit, one of said orifices being in each quadrant of the seat plate, an axially rotatable valve plate seated in said recess axially aligned with the seat plate and having ports therein diametrally oppositely disposed for selectively communicating with the orifices of the seat plate upon rotation of the valve plate, a packing washer interposed between the seat plate and valve plate and having openings therethrough registering with the opening in one of said plates, means for axially rotating the valve plate, and a tubular discharge nozzle mounted in communication with the ports of the valve plate.

HARRY R. B. PETERSON.

REFERENCES CITED

The following references are of record in the file of this patent:

UNITED STATES PATENTS

| Number | Name | Date |
| --- | --- | --- |
| 39,795 | Broughton | Sept. 8, 1863 |
| 796,252 | Ross | Aug. 1, 1905 |
| 1,427,606 | Leahy | Aug. 29, 1922 |
| 1,478,227 | Hoffman | Dec. 18, 1923 |
| 1,564,856 | Karlsen | Dec. 8, 1925 |
| 1,646,575 | Carder | Oct. 25, 1927 |
| 1,680,119 | Schulder | Aug. 7, 1928 |
| 1,842,894 | Breegle | Jan. 26, 1932 |